(12) United States Patent
Julian et al.

(10) Patent No.: US 7,896,296 B2
(45) Date of Patent: Mar. 1, 2011

(54) OFFSET TUBE CLAMP

(75) Inventors: Frank D. Julian, Kansas City, MO (US); Joseph P. Ismert, Kansas City, MO (US); Truman J. Stegmaier, Lee's Summit, MO (US)

(73) Assignee: Sioux Chief Mfg. Co., Inc., Peculiar, MO (US)

( * ) Notice: Subject to any disclaimer, the term of this patent is extended or adjusted under 35 U.S.C. 154(b) by 257 days.

(21) Appl. No.: 11/933,907

(22) Filed: Nov. 1, 2007

(65) Prior Publication Data

US 2009/0114776 A1 May 7, 2009

(51) Int. Cl.
*F16L 3/22* (2006.01)

(52) U.S. Cl. ............ 248/68.1; 248/71; 248/547; 248/911

(58) Field of Classification Search .......... 248/65, 248/71, 68.1, 74.1, 547, 544, 558, 207, 911; 174/154

See application file for complete search history.

(56) References Cited

U.S. PATENT DOCUMENTS

| | | | | |
|---|---|---|---|---|
| 1,163,132 A | * | 12/1915 | Ette | 248/547 |
| 1,592,974 A | * | 7/1926 | Foerster, Jr. et al. | 52/292 |
| 3,129,917 A | * | 4/1964 | Huggins | 248/218.4 |
| 3,700,197 A | * | 10/1972 | Branton | 248/71 |
| 5,090,645 A | | 2/1992 | Zuercher | |
| 5,385,320 A | | 1/1995 | Ismert | |
| 5,765,786 A | | 6/1998 | Gretz | |
| 6,073,891 A | * | 6/2000 | Humber | 248/74.5 |
| 6,672,029 B2 | | 1/2004 | Tucker | |
| 6,702,236 B1 | | 3/2004 | Kirschner | |
| 6,719,247 B1 | | 4/2004 | Botting | |
| 6,857,606 B1 | | 2/2005 | Gretz | |
| 2005/0011996 A1 | | 1/2005 | Geater | |

OTHER PUBLICATIONS

Advertising materials of Dill Products, Inc. showing Wood Offset Tube Clamp; exact date of publication unknown but believed to be more than one year prior to the filing date of the present application.

* cited by examiner

*Primary Examiner*—Korie Chan
(74) *Attorney, Agent, or Firm*—Erickson, Kernell, Derusseau & Kleypas, LLC (57) ABSTRACT

An offset tube clamp includes a base having a pair of feet with generally coplanar bottom surfaces and a notch between the feet. A post extends upwardly from the base, and at least one tube cradle is formed on the post at a position spaced apart from the base. The tube clamp further includes a nailway having a fastener receiving opening for receiving a fastener. The fastener receiving opening intersects the notch in the base. The tube clamp is alternatively mountable to a building member in either a first orientation with the bottom surfaces of the feet flush against a surface of the building member, and in a second orientation with the notch in the base receiving a corner of the building member.

32 Claims, 8 Drawing Sheets

OFFSET TUBE CLAMP

BACKGROUND OF THE INVENTION

1. Field of the Invention

This invention relates to tube clamps for fastening a tube to a building member, and in particular to offset tube clamps wherein the tube is held in spaced relation to the building member.

2. Description of the Related Art

Tube clamps are routinely used for fastening a tube, such as a plumbing pipe, to a building member, such as a wall stud, joist, top plate of base plate. The typical tube clamp includes a rigid back and a downwardly extending hook or claw which extends outwardly from the top of the back. The back acts as a nailway and includes a nail receiving aperture. A nail extending through the aperture is driven into a building member to secure the clamp to the building member. The pipe is captured between the claw and the building member.

A problem with this type of clamp is that a pipe held in the clamp will be in contact with the building member. As the pipe expands and contracts with changes in temperature it may rub against the building member causing a noise. Such noise is considered undesirable by homeowners. In addition, heat from hot water pipes can be lost through heat transfer from the pipe to the building member. Another application where standard tube clamps are less than ideal is in the installation of radiant heat tubes. When these tubes are mounted directly to a surface, "hot spots" can be created where the pipe is secured.

Another problem is that inexperienced drywall installers will frequently miss a stud while screwing down drywall and inadvertently pierce a pipe mounted alongside the stud with a drywall screw. In some areas, building inspectors are requiring that the plumber offset the tube away from the surface of the stud. To meet this requirement contractors will stack standard tube clamps or cut a block of wood and mount it to the building member, then put a standard tube clamp on top of the block of wood.

Standard tube clamps are also relatively ineffective for attaching tubes to engineered wood I-joists which are being used more frequently in new construction. These joists are formed of wood flanges with a web of oriented strand board (OSB) to produce an I-shaped structural member. The flanges are relatively narrow and can be difficult to attach a tube to using standard tube clamps.

A prior art tube clamp for attaching tubes to engineered wood I-joists was produced by Dill Products, Inc. and comprised a right angle base with a post extending diagonally outwardly from the apex of the base with a tube cradle mounted at the end of the base. The base included slots for receiving fasteners and could be fastened to a corner of the flange of an I-joist. A tube mounted in the tube cradle would be positioned so as to run alongside the web of the joist. This was a single purpose tube clamp and not readily adapted to mount a tube to a flat surface of a building member.

What is needed is an improved tube clamp which allows for a significant offset between a tube and a building member to which it is secured. Ideally, the tube clamp could be mounted either to a flat surface of a building member, or to a corner of a building member such as an engineered wood I-joist.

SUMMARY OF THE INVENTION

The present invention comprises an offset tube clamp for fastening a tube to a building member. The tube clamp includes a base having a pair of feet with generally coplanar bottom surfaces and a notch between the feet. A post extends upwardly from the base, and at least one tube cradle is formed on the post at a position spaced apart from the base. The tube clamp further includes a nailway having a fastener receiving opening for receiving a fastener. The fastener receiving opening intersects the notch in the base such that a fastener extending through the nailway exits said base through said notch. The tube clamp is alternatively mountable to a building member in either a first orientation with the bottom surfaces of the feet flush against a surface of the building member, and in a second orientation with the notch in the base receiving a corner of the building member.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly"

and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference number 1 generally designates an offset tube clamp according to the present invention which will be described and depicted in several embodiments herein. The clamp 1 is used to attach a pipe, conduit, cable or other tubular member 3 (hereinafter tube 3) to a joist, stud, or other building member 5 and to retain the tube 3 in spaced relation to the building member 5. The tube 3 may be, for example, a ½ inch CTS (Copper Tube Size) pipe having a ⅝ inch outside diameter or a ¾ inch CTS (Copper Tube Size) pipe having a ⅞ inch outside diameter. It is to be understood, however that the invention is not to be limited to use with tubes 3 of these particular diameters, or to CTS pipe in general, as the invention has application to other sizes and types of tube including, but not limited to, IPS (Iron Pipe Size) pipe of varying diameters, electrical conduit and cable.

The clamp 1 is of unitary construction and is preferably molded of a durable plastic, such as ABS (acrylonitrile butadiene styrene) or HDPE (high density polyethylene) or the like.

Figure 1A:
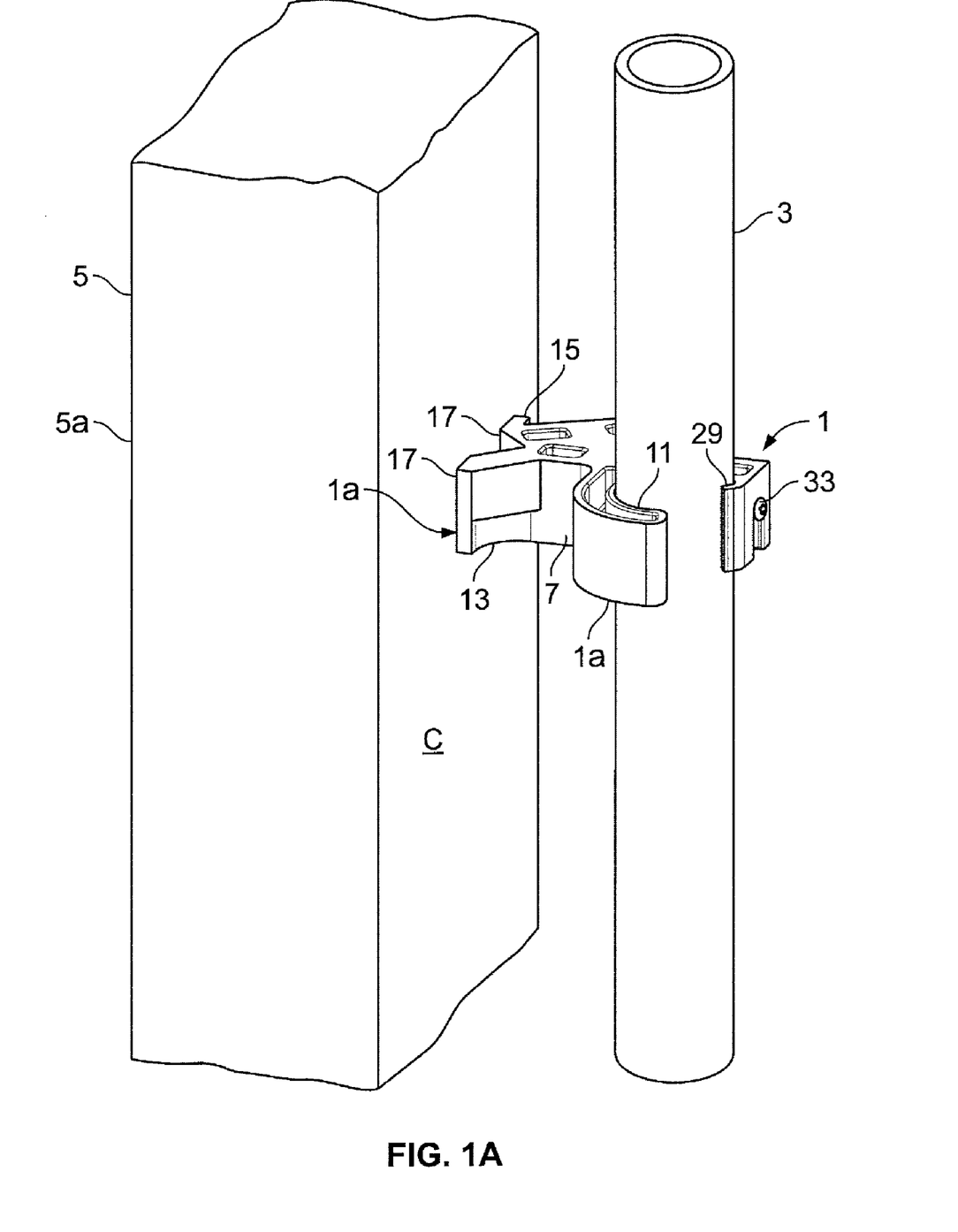
FIG. 1A is a perspective view showing an offset tube clamp according to the present invention mounted in a first orientation on a wall stud.
Figure 1B:
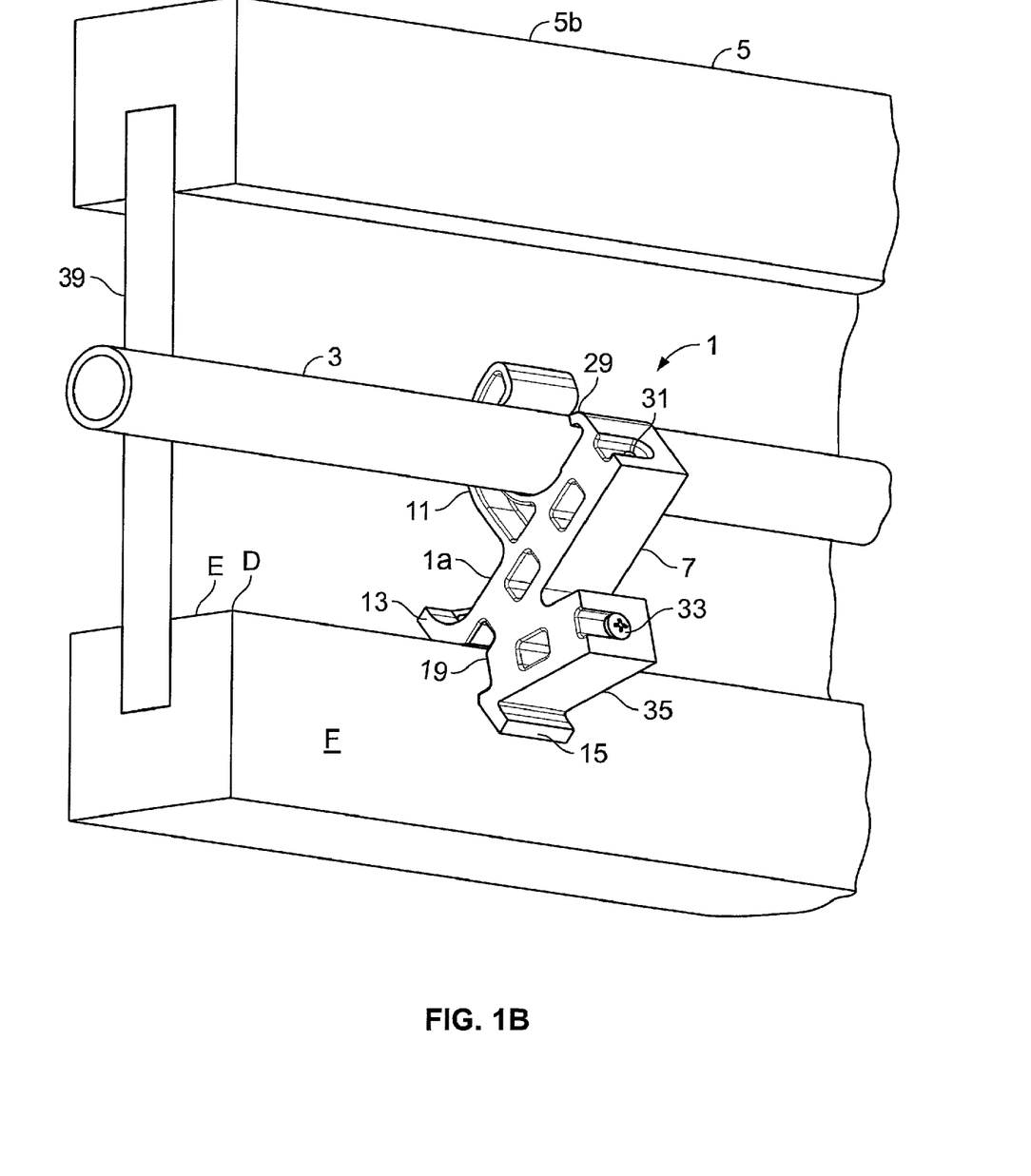
FIG. 1B is a perspective view showing the offset tube clamp mounted in a second orientation on an engineered wood I-joist.
Figure 2:
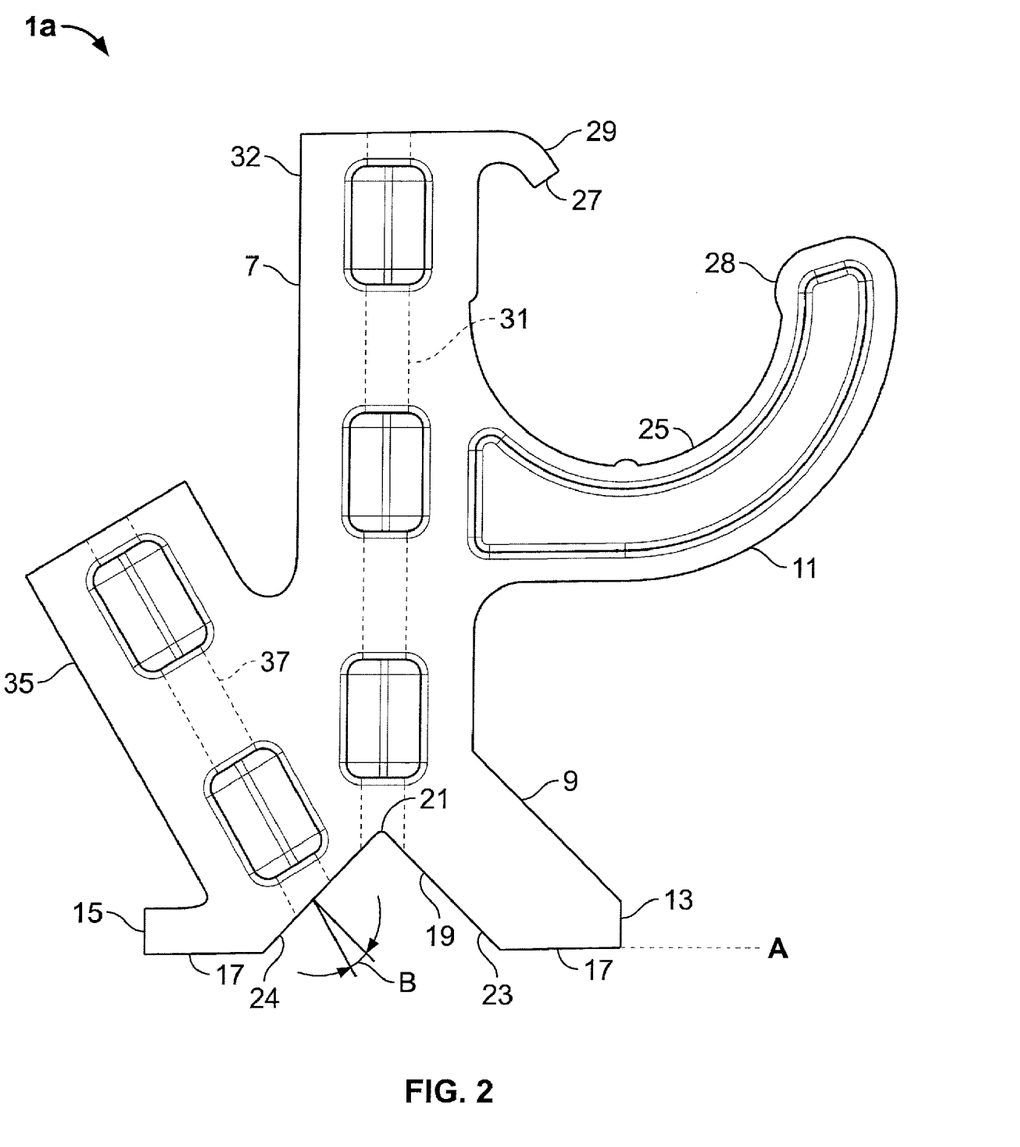
FIG. 2. is a front elevational view of the offset tube clamp.

Referring to FIGS. 1A-2, a first embodiment of the clamp 1, designated herein as clamp 1a, includes a post 7 extending upwardly from a base 9 and a single hook 11 extending outwardly from the post 7 and above the base 9. The base 9 includes first and second feet 13 and 15, respectively. The feet 13 and 15 each include a respective bottom surface 17. The bottom surfaces 17 of the feet 13 and 15 are coplanar and lie in a plane indicated by the dashed line A in FIG. 2. The base 9 further includes a notch 19 which is in the shape of an inverted V which extends upwardly between the feet 13 and 17 to an apex 21. The notch 19 is defined by first and second angled walls 23 and 24, respectively, which are oriented substantially at 90 degrees to one another at the apex 21. The angled walls 23 and 24 each extend upwardly from the plane A at approximately 45 degrees.

The hook 11 extends outwardly from the post 7 in the direction of the first foot 13 and defines a tube cradle 25 sized to receive the tube 3. The hook 11 is spaced upwardly from the base 9 such that a tube 3 resting in the tube cradle 25 will be offset away from the plane A. An upwardly oriented entrance opening 27 allows access to the tube cradle 25 through which the tube 3 may be inserted into the tube cradle 25. An inwardly extending bump or detent 28 is formed on the hook 11 near the distal end thereof, and a downwardly angled tooth 29 extends outwardly from the post 7 above the hook 11. The distance between the end of the tooth 29 and the detent 28 is selected to allow the tube 3 to snap past the tooth 29 and be retained by the tooth 29 in the tube cradle 25.

A first fastener receiving opening 31 extends longitudinally through the post 7 and allows the post 7 to act as a first nailway 32 to receive a fastener 33, such as a nail or screw, for fastening the clamp 1a to a building member 5. The first fastener receiving opening 31 intersects the notch 19 at the apex 21 thereof. The fastener 33 may be preloaded into the first fastener receiving opening 31 for ease of installation.

Optionally, the clamp 1a may further include a second nailway 35 which may be used alternatively to the first nailway 31 to receive a fastener 33. The second nailway 35 is connected to the second foot 15 of the base 9 and extends upwardly at an acute angle to the post 7. The second nailway 35 includes a second fastener receiving opening 37 which extends longitudinally through the second nailway 35 and intersects the notch 19 by extending through the second angled wall 24 thereof. For reasons to be discussed below, the second fastener receiving opening 37 is preferably not perpendicular to the second angled wall 24, but is offset from perpendicular at an acute angle B (see FIG. 2) relative thereto so as to angle away from the first angled wall 23. The fastener 33 may be preloaded into the second fastener receiving opening 37 for ease of installation.

In use, the clamp 1a may be mounted on a building member 5 in either a first orientation, as shown in FIG. 1A or a second orientation as shown in FIG. 1B. In the first orientation, the clamp 1a is positioned with the bottom surfaces 17 of the feet 13 and 15 flat against a surface C of the building member 5 and the post 7 extending outwardly generally normal to the surface C. This first orientation is ideal for mounting a tube 3 in parallel spaced relation to a wall stud 5a, or for supporting a tube 3 in transverse relation across a plurality of joists (not shown). In the second orientation, the clamp 1a is positioned with a corner D of a building member 5 received within the notch 19 and the post 7 extending outwardly at a substantially 45 degree angle to the surfaces E and F adjacent to the corner D. This second orientation is ideal for running a tube along an engineered wood I-joist 5b parallel to a web 39 thereof.

In either the first orientation or the second orientation, the clamp 1a can be fastened to the building member 5 by a fastener 33 installed through either the first nailway 32 or the second nailway 35. Choice of which nailway 32 or 35 to use is primarily dependant on convenience for the installer and available clearance for reaching the fastener 33 with a hammer or electric screwdriver.

It should be noted that it is the angle B described above which allows the second nailway 35 to be effectively used when mounting the clamp 1a in the second orientation. If the second fastener receiving opening 37 of the second nailway 35 were oriented perpendicular to the second angled wall 24, the fastener would run generally parallel and proximate to the surface E of the building member 5 as it is driven into the building member 5. The fastener 33 would thus be prone to split out of the building member, thereby damaging the building member and ineffectively mounting the clamp 1a. Because of the angle B, however, the fastener 33 will bite further into the building member 5 (away from the surface E) as it is driven, thereby reducing the chances of splitting the building member 5.

Figure 3:
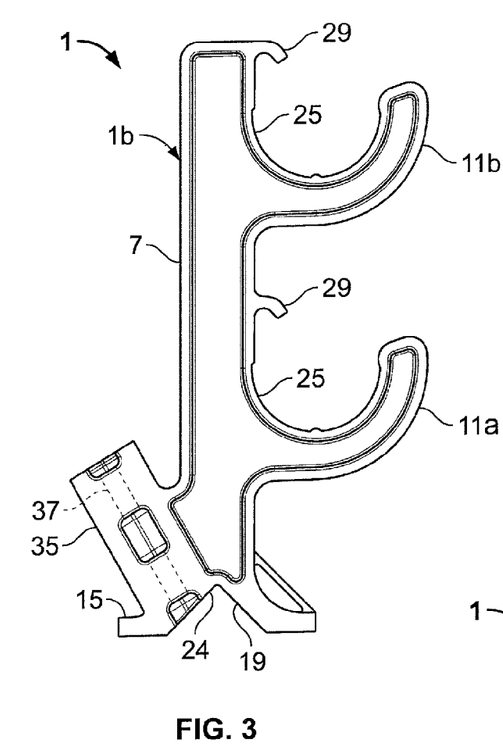
FIG. 3 is a front elevational view of a first alternative embodiment of the offset tube clamp having two longitudinally stacked tube cradles of equal size.
Figure 4:
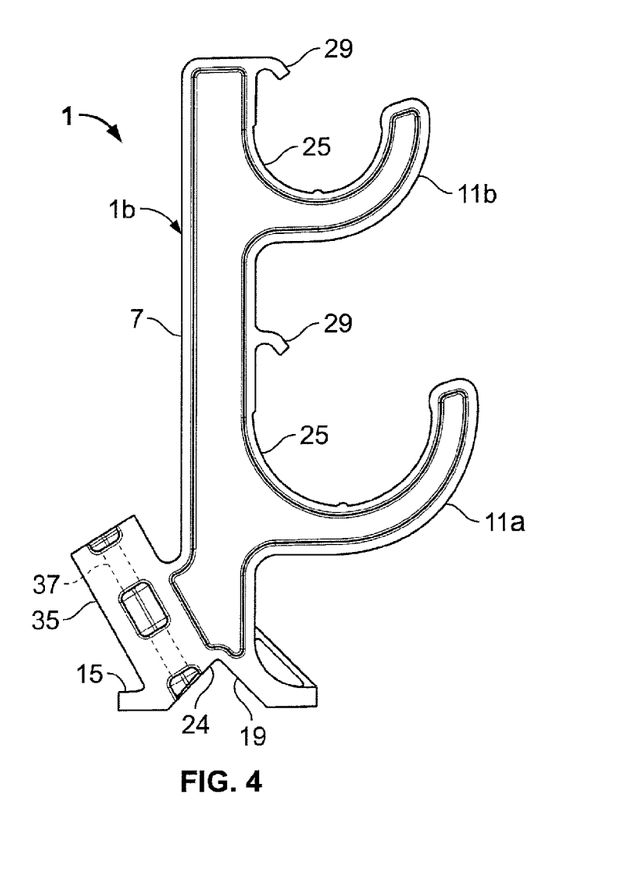
FIG. 4 is a view similar to FIG. 3 showing the first alternative embodiment of the offset tube clamp with tube cradles of disparate size.

A first alternative embodiment of the clamp 1, designated as clamp 1b, is shown in FIGS. 3 and 4. For ease of description, elements of the clamp 1b (and succeeding alternative embodiments) which are the same as elements of the clamp 1a will retain the same reference numbers as used above in relation to the clamp 1a. New elements in each alternative embodiment will be given new reference numbers.

The clamp 1b is similar to the clamp 1a except that it includes two hooks 11a and 11b in a longitudinally stacked configuration, each hook being paired with a respective tooth 29. Each of the hooks 11a and 11b forms a tube cradle 25 sized to receive a respective tube 3. The tube cradles 25 may be of equal size, as shown in FIG. 3, or they may be sized to receive tubes 3 of disparate sizes as shown in FIG. 4. For example, the clamp 1b of FIG. 4 may include a hook 11a forming a tube cradle 25 sized to receive a ¾ inch CTS tube 3, and a hook 11b sized to receive a ½ inch CTS tube 3.

Because of the longer post 7, the clamp 1b is not shown as having a fastener receiving opening extending therethrough which would be equivalent to the first fastener receiving opening 31 described above. Instead, the clamp 1b only includes a single nailway 35 connected to the second foot 15 of the base 9 and extending upwardly at an acute angle to the post 7. As described above, the nailway 35 includes a fastener receiving opening 37 which extends longitudinally through the nailway 35 and intersects the notch 19 by extending through the second angled wall 24 thereof. Again, the second fastener receiving opening 37 is preferably offset from being perpendicular to the angled wall 24.

Figure 5:
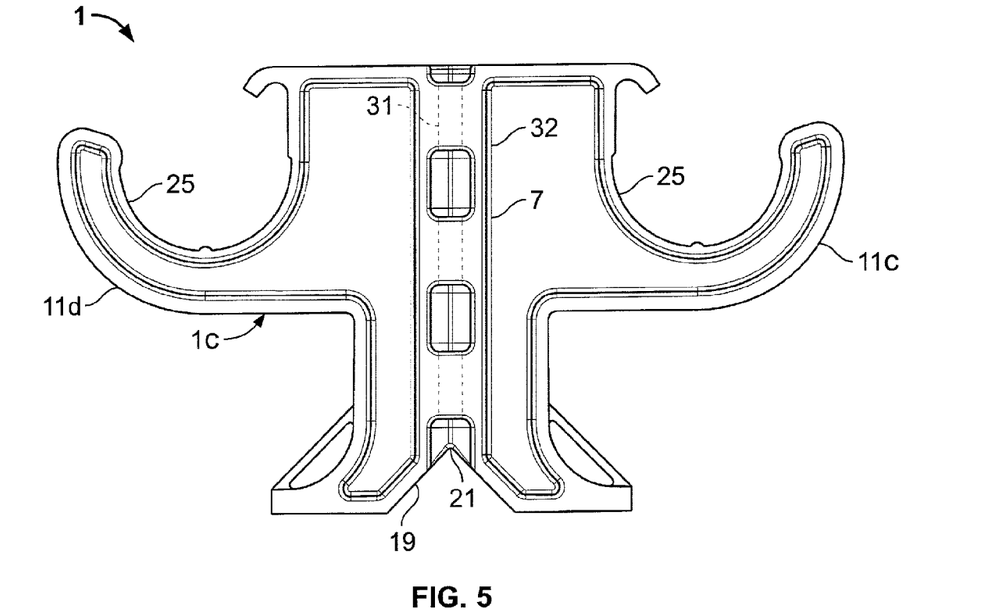
FIG. 5 is a front elevational view of a second alternative embodiment of the offset tube clamp with two laterally paired tube cradles of equal size.
Figure 6:
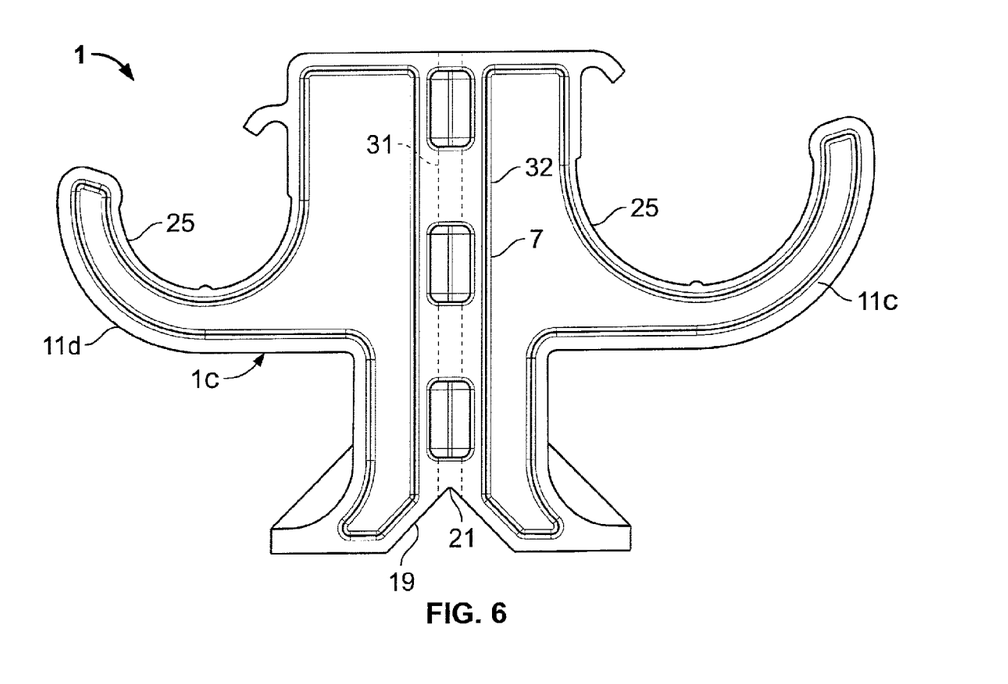
FIG. 6 is a view similar to FIG. 5 showing the second alternative embodiment of the offset tube clamp with tube cradles of disparate size.

A second alternative embodiment of the clamp 1, designated as clamp 1c, is shown in FIGS. 5 and 6. The clamp 1c is similar to the clamp 1a except that it includes two hooks 11c and 11d in a laterally paired configuration, each hook being paired with a respective tooth 29. Each of the hooks 11c and 11d forms a tube cradle 25 sized to receive a respective tube 3. The tube cradles 25 may be of equal size, as shown in FIG. 5, or they may be sized to receive tubes 3 of disparate sizes as shown in FIG. 6. For example, the clamp 1c of FIG. 6 may include a hook 11c forming a tube cradle 25 sized to receive a ¾ inch CTS tube 3, and a hook 11d sized to receive a ½ inch CTS tube 3.

Because of the clamp 1c has hooks 11 extending in both lateral directions, the clamp 11c does not include a nailway which would be equivalent to the second nailway 35 described above. Instead, the clamp 1c only includes a single nailway 32 formed by the post 7. As described above, the nailway 32 includes a fastener receiving opening 31 which extends longitudinally through the post 7 and intersects the notch 19 at the apex 21 thereof.

Figure 7:
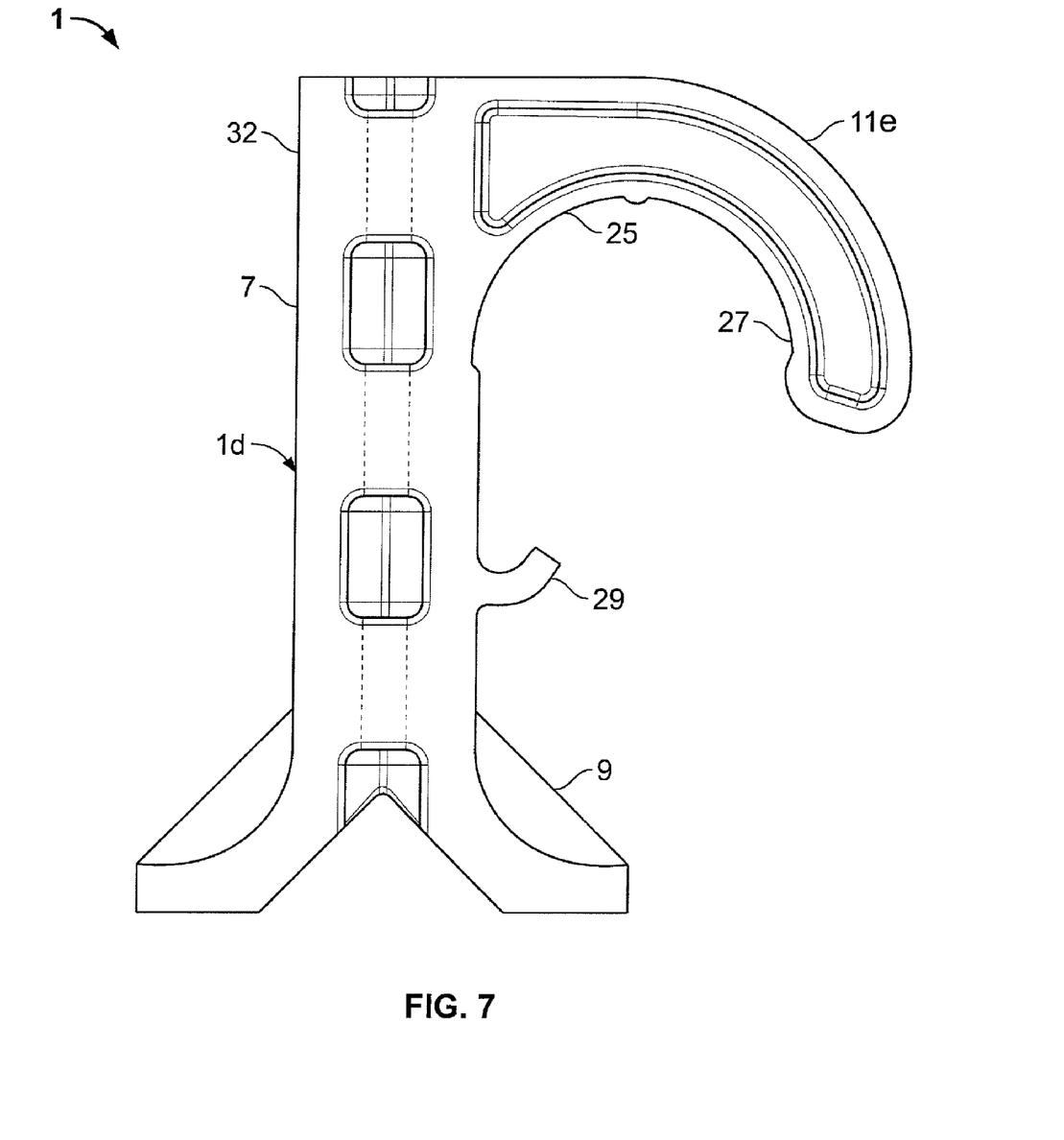
FIG. 7 is a front elevational view of a third alternative embodiment of the offset tube clamp having a single downwardly oriented tube cradle.
Figure 8:
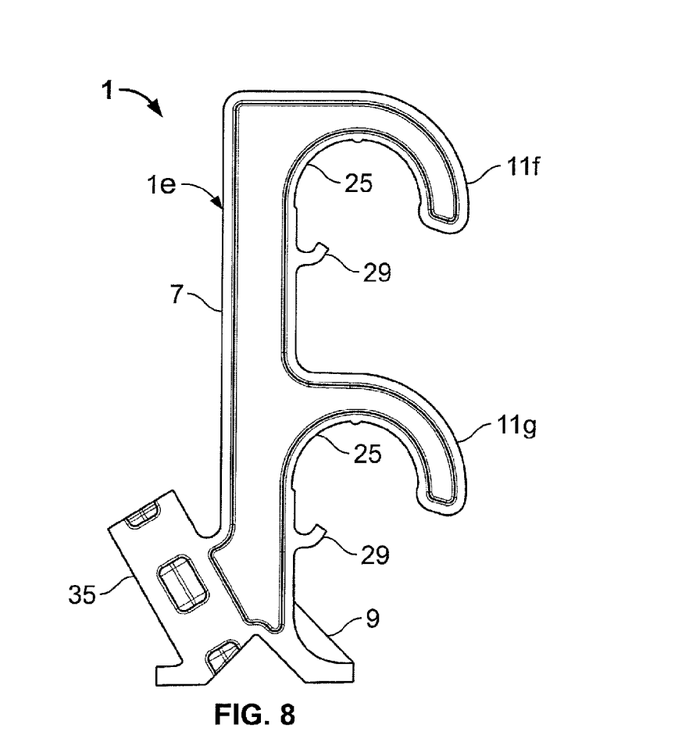
FIG. 8 is a front elevational view of a fourth alternative embodiment of the offset tube clamp having two longitudinally stacked and downwardly oriented tube cradles.
Figure 9:
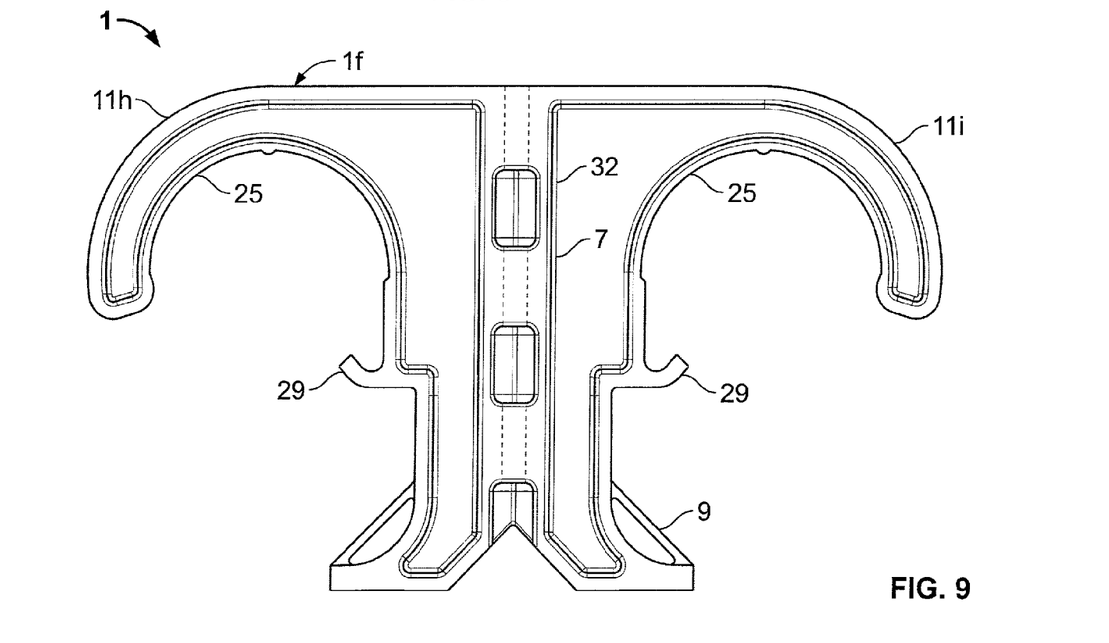
FIG. 9 is a front elevational view of a fifth alternative embodiment of the offset tube clamp having two laterally paired and downwardly oriented tube cradles.

Referring to FIGS. 7-9, the clamp 1 may also be configured with the hook 11 reversed relative to the previously described embodiments such that the entrance opening 27 thereof is oriented downwardly, or toward the base 9. For example, FIG. 7 shows a clamp 1d having a post 7 with a single hook 11e extending outwardly therefrom with its entrance opening 27 oriented toward the base 9. A tooth 29 extends outwardly from the post 7 below the hook 11e. The action of the tooth 29 is sufficient to retain a tube 3 in the cradle 25 of the hook 11e even with the entrance opening 27 positioned below the tube cradle 25. The clamp 1d is shown with only a single nailway 32 formed by the post 7. The base 9 of the clamp 1d is identical to those previously described.

FIG. 8 shows a clamp 1e having two downwardly oriented hooks 11f and 11g in a longitudinally stacked configuration, each hook being paired with a respective tooth 29. Each of the hooks 11f and 11g forms a tube cradle 25 sized to receive a respective tube 3. The tube cradles 25 may be of equal size as shown, or they may be sized to receive tubes 3 of disparate sizes. FIG. 9 shows a clamp 1f having two downwardly oriented hooks 11h and 11i in a laterally paired configuration, each hook being paired with a respective tooth 29. Each of the hooks 11h and 11i forms a tube cradle 25 sized to receive a respective tube 3. The tube cradles 25 may be of equal size, or they may be sized to receive tubes 3 of disparate sizes as shown.

Figure 10:
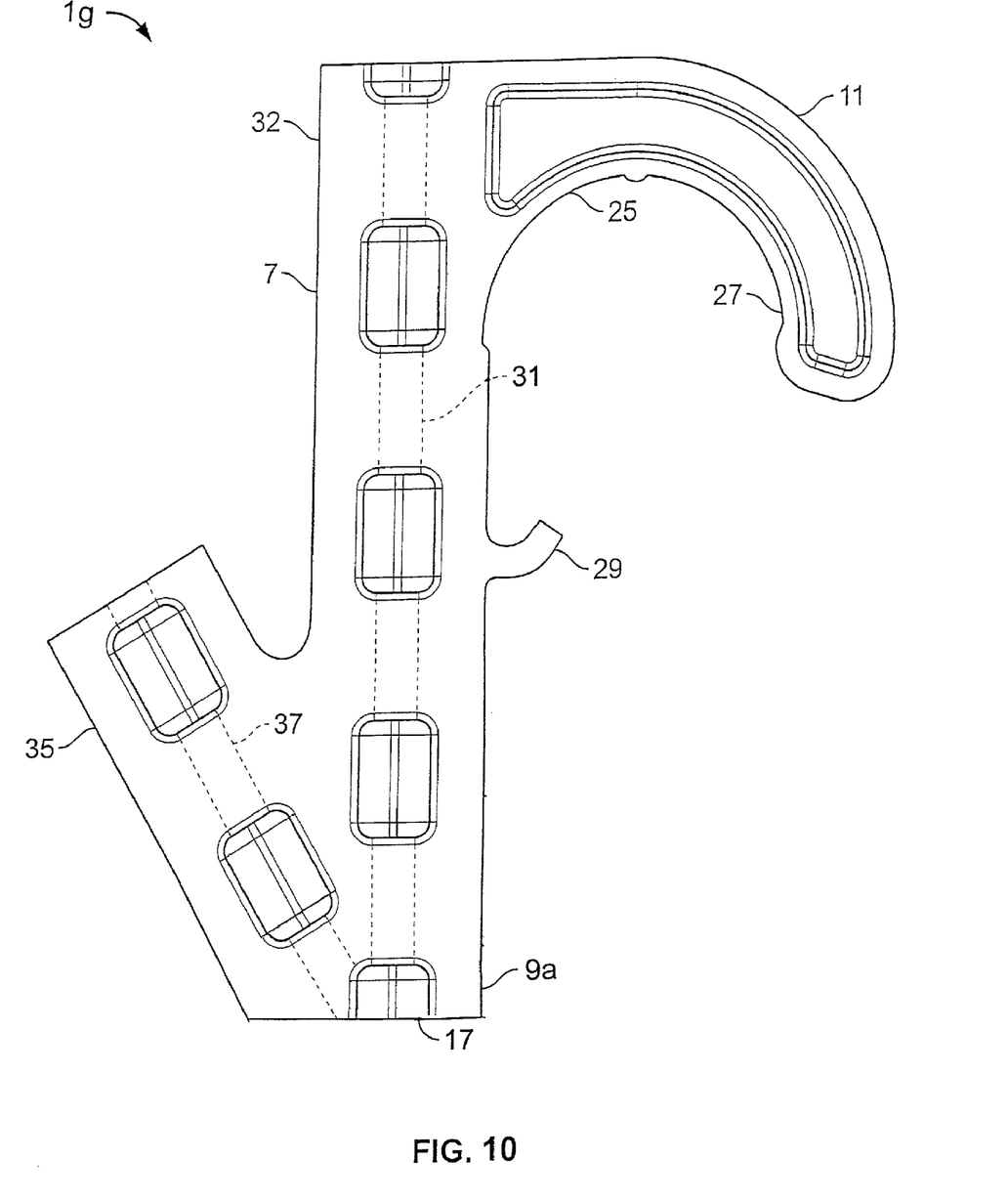
FIG. 10 is a front elevational view of a sixth alternative embodiment of the offset tube clamp having a base without a notch.

Although the notched base 9 described in the previous embodiments is an important and useful feature of the present invention, it may not be required in all applications, for example where only mounting to a flat surface is desired. FIG. 10 depicts a clamp 1g having a base 9a without a notch. The base 9a comprises a lower portion of the post 7 and includes a bottom surface 17. At least one hook 11 extends laterally outward from the post 7 and forms a tube cradle 25 sized to receive the tube 3. The hook 11 is spaced upwardly from the base 9a such that a tube 3 resting in the tube cradle 25 will be offset away from the bottom surface 17. The hook 11 forms an entrance opening 27 which may be either downwardly oriented as shown, or upwardly oriented (not shown).

A first fastener receiving opening 31 extends longitudinally through the post 7 and allows the post 7 to act as a first nailway 32 to receive a fastener (not shown), such as a nail or screw, for fastening the clamp 1g to a building member. The first fastener receiving opening 31 intersects the bottom surface 17 such that a fastener extending therethrough will extend outwardly from the bottom surface 17 generally normal thereto.

The clamp 1g further includes a second nailway 35 which may be used alternatively to the first nailway 31 to receive a fastener. The second nailway 35 is connected to the base 9a and extends upwardly at an acute angle to the post 7. The second nailway 35 includes a second fastener receiving opening 37 which extends longitudinally through the second nailway 35 and intersects the bottom surface 17.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

It is foreseen that the various elements of the invention described above in the several embodiments can be used in different combinations from those described, for example it is foreseen that a tube clamp within the scope of the present invention could have an upwardly oriented tube cradle (as shown in embodiments 1a-1c) on one side of the post and a downwardly oriented tube cradle (as shown in embodiments 1d-1f) on the opposite side of the post, or both upwardly and downwardly oriented tube cradles on the same side of the post. Further, it is foreseen that tube cradles on opposite sides of a post may be longitudinally offset from one another, instead of being directly laterally across from one another.

What is claimed and desired to be secured by Letters Patent is as follows:

1. A tube clamp for fastening a tube to a building member, said tube clamp comprising:
   a) a base including a pair of feet having generally coplanar bottom surfaces and a notch extending into said base between said feet, said notch defined by first and second angled walls;
   b) a post extending outwardly from said base;
   c) a tube cradle formed on said post at a position spaced apart from said base and sized to receive a tube; and
   d) a nailway including a fastener receiving opening for receiving a fastener, said fastener receiving opening intersecting said notch at an apex of said notch formed at an intersection of said first and second angled walls such that a fastener extending through said nailway exits said base through said notch; wherein
   e) said tube clamp is alternatively mountable to a building member in first and second orientations, in said first orientation said bottom surfaces of said feet being flush against a surface of the building member, and in said second orientation said notch receiving a corner of the building member.

2. The tube clamp as in claim 1 wherein said first and second angled walls of said notch are substantially perpendicular.

3. The tube clamp as in claim 2 wherein said first and second angled walls of said notch each intersect a plane defined by said bottom surfaces of said feet at a substantially 45 degree angle.

4. A tube clamp for fastening a tube to a building member, said tube clamp comprising:
   a) a base including a pair of feet having generally coplanar bottom surfaces and a notch extending into said base between said feet, said notch defined by first and second angled walls;
   b) a post extending outwardly from said base;
   c) a tube cradle formed on said post at a position spaced apart from said base and sized to receive a tube; and
   d) a nailway including a fastener receiving opening for receiving a fastener, said fastener receiving opening intersecting said notch through said first angled wall thereof at an orientation which is not perpendicular to said first angled wall such that a fastener extending through said nailway exits said base through said notch; wherein
   e) said tube clamp is alternatively mountable to a building member in first and second orientations, in said first orientation said bottom surfaces of said feet being flush against a surface of the building member, and in said second orientation said notch receiving a corner of the building member.

5. The tube clamp as in claim 4 wherein said fastener receiving opening angles away from said second angled wall of said notch.

6. A tube clamp for fastening a tube to a building member, said tube clamp comprising:
   a) a base including a pair of feet having generally coplanar bottom surfaces and a notch extending into said base between said feet, said notch defined by first and second angled walls;
   b) a post extending outwardly from said base;
   c) a tube cradle formed on said post at a position spaced apart from said base and sized to receive a tube; and
   d) a nailway including a fastener receiving opening for receiving a fastener, said nailway formed by said fastener receiving opening extending longitudinally through said post and extending the full length of said post from a top end thereof to said notch in said base and intersecting said notch such that a fastener extending through said nailway exits said base through said notch; wherein
   e) said tube clamp is alternatively mountable to a building member in first and second orientations, in said first orientation said bottom surfaces of said feet being flush against a surface of the building member, and in said second orientation said notch receiving a corner of the building member.

7. The tube clamp as in claim 6 wherein said nailway is a first nailway and said tube clamp further includes a second nailway extending outwardly from said base at an acute angle to said post.

8. The tube clamp as in claim 1 wherein said tube cradle is defined by a hook extending outwardly from said post.

9. The tube clamp as in claim 8 wherein said tube cradle is a first tube cradle, said hook is a first hook, and said tube clamp further includes a second hook defining a second tube cradle.

10. The tube clamp as in claim 9 wherein said first and second hooks are laterally paired on the opposite sides of said post.

11. The tube clamp as in claim 9 wherein said second tube cradle is sized to receive a tube of a diameter different from the diameter of the tube for which said first tube cradle is sized.

12. The tube clamp as in claim 8 wherein said hook has an entrance opening on a side of said hook opposite said base.

13. The tube clamp as in claim 8 wherein said hook has an entrance opening on a side of said hook adjacent to said base.

14. A tube clamp for fastening a tube to a building member, said tube clamp comprising:
   a) a base including a pair of feet having generally coplanar bottom surfaces and a notch extending into said base between said feet, said notch defined by first and second angled walls meeting at an apex;
   b) a post extending outwardly from said base;
   c) a hook extending outwardly from said post and defining a tube cradle at a position spaced apart from said base and sized to receive a tube; and
   d) a fastener receiving opening extending longitudinally through said post and forming a nailway for receiving a fastener, said fastener receiving opening intersecting said notch at said apex thereof; wherein
   e) said tube clamp is alternatively mountable to a building member in first and second orientations, in said first orientation said bottom surfaces of said feet being flush against a surface of the building member, and in said second orientation said notch receiving a corner of the building member.

15. The tube clamp as in claim 14 wherein said nailway is a first nailway, said fastener receiving opening is a first fastener receiving opening, and said tube clamp further includes a second nailway extending outwardly from said base at an acute angle to said post, said second nailway having a second fastener receiving opening extending therethrough and intersecting said notch through said first angled wall thereof.

16. The tube clamp as in claim 14 wherein said first and second angled walls of said notch are substantially perpendicular to one another and intersect a plane defined by said bottom surfaces of said feet at a substantially 45 degree angle.

17. A tube clamp for fastening a tube to a building member, said tube clamp comprising:
   a) a base including a pair of feet having generally coplanar bottom surfaces and a notch extending into said base between said feet, said notch defined by first and second angled walls which are substantially perpendicular to one another;
   b) a post extending outwardly from said base;
   c) a hook extending outwardly from said post and defining a tube cradle at a position spaced apart from said base and sized to receive a tube; and
   d) a nailway formed on said base and extending outwardly from said base at an acute angle to said post;
   e) a fastener receiving opening extending longitudinally through said nailway for receiving a fastener, said fastener receiving opening intersecting said notch through said first angled wall thereof at an orientation which is not perpendicular to said first angled wall such that said fastener receiving opening angles away from said second angled wall; wherein
   f) said tube clamp is alternatively mountable to a building member in first and second orientations, in said first orientation said bottom surfaces of said feet being flush against a surface of the building member, and in said second orientation said notch receiving a corner of the building member.

18. The tube clamp as in claim 17 wherein said nailway is a first nailway, said fastener receiving opening is a first fastener receiving opening, and said tube clamp further includes a second nailway formed by a second fastener receiving opening extending longitudinally through said post, said second fastener receiving opening intersecting said notch at an apex of said notch formed at an intersection of said first and second angled walls.

19. The tube clamp as in claim 17 wherein said first and second angled walls of said notch each intersect a plane defined by said bottom surfaces of said feet at a substantially 45 degree angle.

20. A tube clamp for fastening a tube to a building member, said tube clamp comprising:
   a) a base having a bottom surface;
   b) a post extending outwardly from said base in a direction opposite said bottom surface;
   c) a tube cradle formed on said post at a position spaced apart from said base and sized to receive a tube;
   d) a first nailway including a first fastener receiving opening extending longitudinally through said post and extending the full length of said post from a top end thereof to said base and exiting through said bottom surface of said base; and
   e) a second nailway extending outwardly from said base at an acute angle to said post, said second nailway having a second fastener receiving opening extending therethrough and exiting through said bottom surface of said base.

21. The tube clamp as in claim 4 wherein said tube cradle is defined by a hook extending outwardly from said post.

22. The tube clamp as in claim 21 wherein said tube cradle is a first tube cradle, said hook is a first hook, and said tube clamp further includes a second hook defining a second tube cradle.

23. The tube clamp as in claim 22 wherein said first and second hooks are longitudinally stacked on the same side of said post.

24. The tube clamp as in claim 22 wherein said second tube cradle is sized to receive a tube of a diameter different from the diameter of the tube for which said first tube cradle is sized.

25. The tube clamp as in claim 21 wherein said hook has an entrance opening on a side of said hook opposite said base.

26. The tube clamp as in claim 21 wherein said hook has an entrance opening on a side of said hook adjacent to said base.

27. The tube clamp as in claim 6 wherein said tube cradle is defined by a hook extending outwardly from said post.

28. The tube clamp as in claim 27 wherein said tube cradle is a first tube cradle, said hook is a first hook, and said tube clamp further includes a second hook defining a second tube cradle.

29. The tube clamp as in claim 28 wherein said first and second hooks are laterally paired on the opposite sides of said post.

30. The tube clamp as in claim 28 wherein said second tube cradle is sized to receive a tube of a diameter different from the diameter of the tube for which said first tube cradle is sized.

31. The tube clamp as in claim 27 wherein said hook has an entrance opening on a side of said hook opposite said base.

32. The tube clamp as in claim 27 wherein said hook has an entrance opening on a side of said hook adjacent to said base.

\* \* \* \* \*